United States Patent [19]

Pfoutz et al.

[11] 4,033,697

[45] July 5, 1977

[54] AUTOMATIC EXPOSURE CONTROL FOR A LUMINOUS OBJECT MONITOR SYSTEM

[75] Inventors: Ray W. Pfoutz, Sunnyvale; Karl H. Mauritz, Santa Clara; John P. Skurla, Los Gatos, all of Calif.

[73] Assignee: Reticon Corporation, Sunnyvale, Calif.

[22] Filed: May 17, 1976

[21] Appl. No.: 686,697

[52] U.S. Cl. .............................. 356/160; 250/201; 250/560; 356/167
[51] Int. Cl.² .................... G01J 1/20; G01B 11/00; G01B 11/04
[58] Field of Search ................. 356/158, 160, 167; 250/201, 560, 553, 563, 209; 178/DIG. 36, DIG. 37; 340/146.3 AH; 355/168

[56] References Cited

UNITED STATES PATENTS

| | | | |
|---|---|---|---|
| 2,931,917 | 4/1960 | Beelitz | 356/159 |
| 3,193,681 | 7/1965 | Schwarz | 250/209 |
| 3,501,623 | 3/1970 | Robinson | 340/146.3 AH |
| 3,589,813 | 6/1971 | Sturzinger | 250/201 |
| 3,736,063 | 5/1973 | Ohno et al. | 356/160 |

Primary Examiner—John K. Corbin
Assistant Examiner—Wm. H. Punter
Attorney, Agent, or Firm—Limbach, Limbach & Sutton

[57] ABSTRACT

A system for measuring a dimension, such as the width, of a hot strip of material on line, particularly steel and glass. The system utilizes two arrays of light sensitive electronically scanned detectors, placed above the hot strip and spaced apart at a distance to permit viewing each edge. Each sensor images the hot strip onto the array of photo sensitive detectors. Using visible and infrared radiation of the hot strip as the energy to expose the detectors, position information of each edge is determined and electronically added to the fixed dimension between the two sensors resulting in a value equal to the total width. The measurement is automatically updated many times per second, as the occasion demands. In order to compensate for varying temperatures of the hot material, the system employs an automatic exposure control which varies the time required to complete a scanning cycle of the electronic detectors in response to changes in the intensity of the lumination of the object to thereby vary the exposure to the detectors.

14 Claims, 8 Drawing Figures

AUTOMATIC EXPOSURE CONTROL FOR A LUMINOUS OBJECT MONITOR SYSTEM

BACKGROUND OF THE INVENTION

The invention relates broadly to the object measuring art, and more specifically to the art concerned with on line measurement and instant determination of physical parameters by non-contacting means.

Hot rolling of steel ingots into strips is traditionally divided into at least four processes. Slabbing ingots (as cast) are first handled in a blooming and slabbing mill, to emerge typically as 20 foot long, 4 to 8 inch thick sections. Roughing stands reduce thickness further to (typically) three quarters of an inch. In the finishing train, the steel sheet reaches its final thickness and is then water cooled and coiled.

In rolling, a complex relationship exists between composition, temperature, speed, thickness reduction per pass and resulting strip width. Oversize results in increased tonnage without monetary benefits and undersize results in scrap at the coilers. To avoid such losses, it is desirable to monitor directly or indirectly all process parameters and to make the data available to upstream and downstream work stations for on line process corrections.

As with steel strips, float glass plants have similar requirements to monitor both width and edge position and although the consequences may not result in similar losses, product output and good quality are associated with accurate real time dimensional data. Because of high temperatures and line speeds, on line width measurement of float glass at the softened stage and strip steel in the finishing train are particularly difficult. Only reliable, non-contacting methods with fast response times are suitable.

The problems associated with conventional and antiquated methods of hot-strip width measurement deal with moving mechanisms and traversing optical sensors. These may include totally analog technology which is plagued with drift and the necessity for frequent recalibration. A still greater problem, however, is that because the temperature of the hot material may vary, not only along the length but even across the width of the material, the level of illumination reaching the sensors may vary causing a miscalculation in the observed dimension of the hot material. For example, the edge portions of the hot material are typically colder than the midwith portion and thus may not be accurately sensed by the photo detectors.

One prior art system atempted to overcome this problem by providing a mechanical aperture control for one of the photo detectors. See, for example, U.S. Pat. No. 2,931,917. Unfortunately, analog exposure control is far too slow and inaccurate for modern process technology. Another prior art system attempted to overcome the basic slowness of analog measuring systems by providing electronically scanned photo detectors. See, for example, U.S. Pat. No. 3,736,063. This electronically scanned system, however, did not make any provision for varying the exposure of the photo detector to compensate for variations in the temperature of the material. With such electronically scanned photo detectors, the exposure is a product of the intensity of the lumination and the exposure time on the photo detectors. Such devices have exposure ranges which may, for example, be suitable for sensing the presence or absence of the hot material but may be unsuitable for also accurately sensing the edge position of the hot material. What is required is a way to automatically vary the exposure range swiftly so that both tasks may be performed with high accuracy.

SUMMARY OF THE INVENTION

The above and other disadvantages of prior art automatic monitoring systems are overcome by the present invention of an improved apparatus for monitoring a light emitting workpiece by sensing the intensity of lumination given off by the workpiece, the apparatus of the invention including electronically scanned photo detection means for sensing the level of lumination emitted over a predetermined area of the workpiece and for producing a video output signal representative thereof, the photo detection means having a predetermined, dynamic exposure range which is electronically variable as a function of the time duration to complete one scanning cycle. Means responsive to a predetermined parameter of the video signal from the photo detection means determine if the intensity of the lumination of the workpiece extends outside of the range of the photo detection means and produces an exposure control signal. Scanning control means, responsive to the exposure control signal, vary the time required to complete one scanning cycle of the photo detection means in order to shift the dynamic exposure range of the photo detection means to include the level of intensity of lumination from the workpiece.

In the preferred embodiment of the invention, the photo detection means comprise an electronically scanned array of light sensitive photo detectors, including means for producing a train of analog electrical pulses each having an amplitude proportional to the light intensity on a separate photo detector of the array. In the ordinary operation of such electronically scanned photo detector arrays, that is, the camera, a single threshold is set which is midway in the voltage range of the camera. Objects are not "seen" unless they produce sufficient light energy to break through this threshold. Then elements above the threshold are deemed light (high) and those below the threshold are deemed dark (low). To produce a process control signal, each analog pulse amplitude is compared by a first comparing means to the pre-set threshold voltage level to produce a train of binary, video pulses having a logical zero for analog pulses whose amplitudes are below the threshold level (i.e. dark) and a logical one for analog pulses whose amplitudes are above the threshold level (i.e. light).

The means for producing the exposure control signal also compare the amplitudes of a predetermined set of the analog electrical pulses with the threshold level and produce an exposure control signal which causes the scan control means to increase the time required to complete a scanning cycle when the amplitudes of the set of analog signals are below the threshold level and to decrease the time required to complete a scanning cycle when the amplitudes of the set of analog signals are above the threshold level.

In the preferred embodiment, the scan control means carries out this process by one of two methods. Either the scanning frequency is varied or the time between the end of the scan and the beginning of a new scan is varied. In both cases, the total time required to complete one scan and begin a new scan is varied to control the exposure time and thus, the exposure level.

Because of the wide variations in energy being emitted from the hot material, the photo detector means must initially be operating at a long exposure time, that is, a long time for one complete scanning cycle, to allow the photo detectors to detect the lowest temperature material. With the camera operating at a long complete scanning cycle time, the lowest possible temperature is "seen" and high temperature radiating objects will saturate the photo detector array and the exact radiation level will not be known. In one embodiment of the invention, for each process to be monitored, a predetermined reference voltage level is previously chosen as the criterion for determining the correct exposure level once the hot material is in view. The task is then in some manner to change the time required for a complete line scan cycle of the camera and again check the exposure level to see if the camera analog output voltage has reached the reference level. This series of exposing and checking steps can be carried out in at least three different ways, however, it is important that this exposure search and verification checking be done extremely fast in order to not unduly limit the response of the system.

In at least one embodiment of the invention, the scanning means initially causes the photo detector means to be scanned at the longest available complete cycle time in order to initially detect the presence of the hot material. Once the presence of the hot material is detected, the exposure control signal means produce an exposure control signal to the scanning control means which repeatedly and sequentially both decrease the time required for a complete scanning cycle by a predetermined increment and then compare the amplitudes of the predetermined set of analog electrical pulses with the threshold level until the amplitudes are within a predetermined amount of the threshold level. The exposure control means thereafter generate an exposure control signal to the scan control means to increase the complete scanning cycle time by a fixed amount to establish an operating exposure level for the photo detector means which is greater than that represented by the reference level.

In one embodiment, this is done simply by decreasing or increasing the complete cycle scanning time by equal predetermined increments. This is a sequential approach to establishing a proper exposure and has the advantage that for low material temperatures, it is both simple and fast. For higher steel temperatures, it is relatively slow. In another embodiment, a successive approximation technique is used in which the available exposure range is cut in half and a decision is made as to in which half the correct exposure lies; the half sampled or the other half. To carry out this technique, the incremental decreases in the complete scanning cycle time are repeatedly selected to be the equivalent of one half of the remaining available exposure range of the photo detection means until the set of analog pulse amplitudes exceed the threshold level. The exposure control signal means thereafter similarly increases the complete scanning cycle time until the set of analog pulse amplitudes is less than the threshold level. The exposure control means repeat this sequence of successive approximation steps until the set of analog pulse amplitudes is within a predetermined amount of the threshold level. For high material temperatures, this method is far faster than the sequential approach because it involves fewer steps.

In order to calibrate the system, calibration units are used which are viewed by the camera when the subject material is not being measured. In one preferred form of the invention, these calibration units comprise heated rods which extend underneath the transport for the hot material. Since the calibration units produce a different energy output than the subject material, the automatic exposure system adjusts to make the correct measurement. This not only checks the optical-mechanical alignment of the system and the measurement electronics, but also checks the automatic exposure control system which must function properly to give a correct width reading.

It is therefore an object of the present invention to provide an electronically scanned photo detector, which is relatively independent of the temperature of the luminous object being measured.

It is another object of the invention to provide a luminous material electronically scanned width monitor system which has a self-adjusting exposure control.

It is still another object of the invention to provide a luminous material electronically scanned width monitor system which includes luminous calibration sources.

The foregoing and other objectives, features and advantages of the invention will be more readily understood upon consideration of the following detailed description of certain preferred embodiments of the invention, taken in conjuction with the accompanying drawings.

DETAILED DESCRIPTION OF CERTAIN PREFERRED EMBODIMENTS

Figure 1:
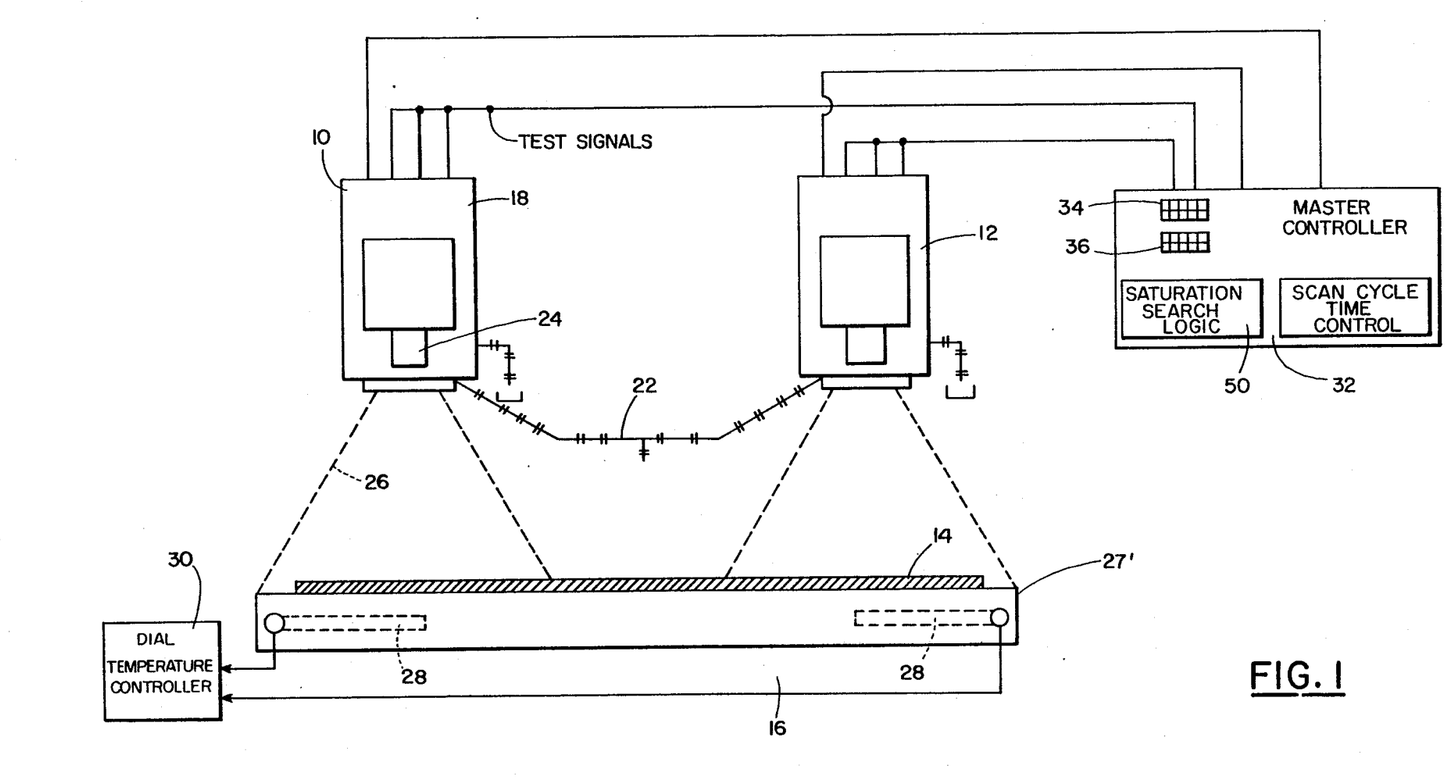
FIG. 1 is a diagramatic view of the width monitoring system according to the invention.

Referring now more particularly to FIG. 1, a block diagram of the width monitoring system of the invention is illustrated in which a pair of side-by-side cameras 10 and 12 are positioned over a moving strip of hot material 14 supported on a transport bed 16. Each camera is housed in a high temperature enclosure 18 which is supplied with cooling water 20 and a source of air under pressure to prevent accumulation of foreign matter on the enclosure windows. Each camera further includes a lens 24 which has a field of view 26 that includes a different one of the edges of the strip of hot material 14. The spacing between the cameras is predetermined. A pair of high temperature heating elements 28 extend into slots in the transport bed 16 underneath the strip of hot material 14. These heating elements are supplied with electrical energy from a temperature controller 30 so that the elements are heated to a known temperature. The heating elements thus allow for physical calibration of the system both as to width measuring and as to exposure control.

The outputs from the cameras 10 and 12 are fed to a master controller unit 32. The purpose of the master controller is to both monitor the width of the hot material 14 as determined by the camera signals and to vary the exposure of the cameras to take into account the changing temperatures of the hot material 14.

The cameras 10 and 12 include linear arrays of tiny photo diodes (not shown). Other types of electronically scanned photo detector cameras using other photo detectors such as, for example, charge coupled devices, would also be suitable. The use of the term "photo diode" is to be considered as merely one example of a suitable device. The field of view 26 imaged by each lens 24 onto the photo diode array within each camera, is scanned electronically to produce a train of analog electrical pulses, each having an amplitude proportional to the light intensity on a corresponding photo diode. As discussed above, these pulses are then compared to a preset threshold level to produce a train of binary pulses, that is, a logical zero for light below the threshold (black) and a logical one for light levels above the threshold (white). The pulses before or after a black-white transition, e.g. an edge, can be electronically counted to determine the position of an edge.

The video data transmitted by the cameras 10 and 12 to the master controller 32 is decoded and reconstructed to an equivalent BCD signal proportional to the measured position of each hot strip edge. The value is referenced to points 27 and 27' outboard of the strip 14 and geometrically equal to the projected location of photo doide element number one of each camera. Assuming an optical magnification of 30 power and 0.001 inch spacing of the photo diode elements, each element in the camera is about equal to 0.003 inches. If the first group of dark elements of the scanned array total 100, then the absolute edge position would be equal to 3.00 inches from the reference point. By subtracting the remaining (luminated) elements in the array of each camera and adding the constant fixed dimension equal to the spacing between the two cameras, an output signal equal to the total strip width is generated. This signal is displayed in true numeric fashion at the master controller on a display panel 34 and is also transmitted serially to remote indicating stations, chart recorders and process control devices. Since this portion of the system is basically within the skill of the art, the particulars of the width measuring will not be described in greater detail.

The time required to scan a line in the photo diode array can be varied electronically from 0.04 seconds down to $N \times 10^{-6}$ seconds where N is the number of diodes in the array. As with a photographic camera, the longer the exposure time, that is the longer the time required to complete one scan and begin another scan, the less light intensity is required to produce an image. On the other hand, the shorter the exposure time, the less likely the image is to be blurred by motion of the object being scanned. In the preferred embodiment of the invention, each complete scan of the photo diode array represents about 1 inch of travel of the hot material assuming it moves at a velocity of about 500 feet per minute. This is derived in the following manner: the camera scans about 100 times per second, and the material speed is 500 feet per minute, or 100 inches per second. Therefore, during each scan of the photo diode array, this hot material moves about 1 inch. Greater accuracy can, of course, be achieved by averaging a number of different scans, as will be explained infra.

The set point or the desired width is programmed into the master controller by one of two means. It may be done manually through digital thumb wheel switches 36 at the master controller or at a remote station or it may be done automatically via an external process control computer. The set point value, also in digital format, is compared against the actual measured width and the resulting signal is compared to preset high and low limits for alarm purposes. The difference between the set point and the actual measured value will also be displayed remotely and recorded as deviation data.

Because the amount of illumination reaching the cameras 10 and 12 is dependent upon the temperature of the hot strip 14, the apparent edges of the hot strip, as measured by the cameras 10 and 12, may also vary due to these illumination changes. Furthermore, the cameras 10 and 12 must be able to detect the presence and absence of the hot strip in the first place. Since the range in temperature of hot material from not being present at normal operating temperature is far beyond the exposure range of the camera, an automatic exposure adjustment control must be provided. The master controller may then be employed to control the exposure time of the cameras. For the photo diode array cameras 10 and 12 of the invention, the exposure time is proportional to the complete line scan time cycle, i.e., the time it takes to begin and end one complete scan and then to begin a second scan. This, as mentioned above, can be controlled either by varying the line scanning frequency or by controlling the number of pulses counted between the end of one scan and the beginning of a new one.

To automate the exposure controls, three areas must be dealt with. The first is the signature criteria which are used to determine the exposure. That is, what parameter of the video signal from the camera is used to judge the exposure level. A second area is the electronics used to control the exposure from that required to first see the steel, to evaluate the video signal and then to step through the exposure levels until the proper level is reached. The third area is the method for altering the exposure time by varying the photo diode scanning frequency or by varying the number of clock pulses counted between the end of one scan and the beginning of another scan.

Figure 2:
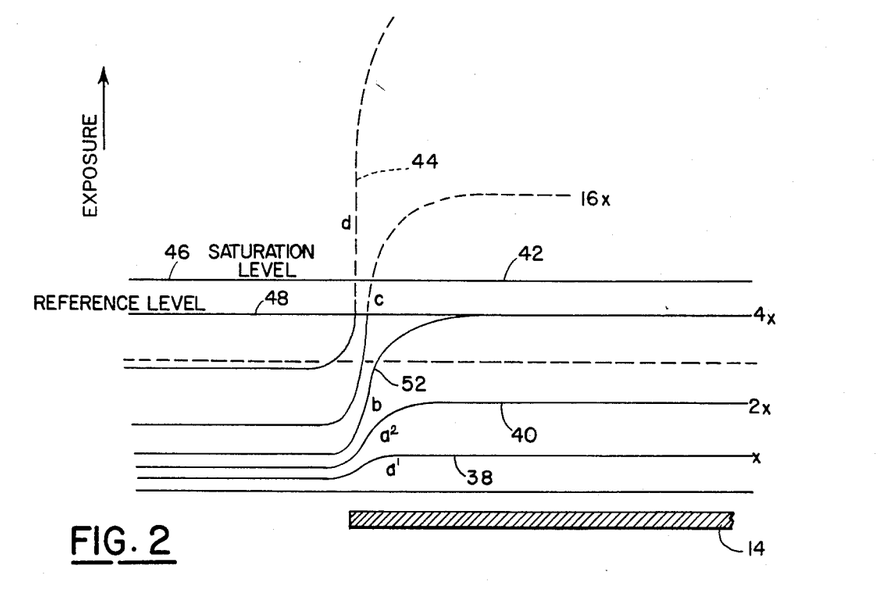
FIG. 2 is a wave form diagram of the analog video output from the camera used in the system for different exposure levels across a portion of the width of the material being measured.

With reference now more particularly to FIG. 2, the signature criteria for the video signal will be discussed. FIG. 2 is a series of wave form diagrams depicting the voltage amplitude of the video signal with respect to the distance across the width of the hot material 14. The longer the time required to complete one scan of the photo diode array, that is the longer the exposure time, the greater will be the amplitude of the video signal and hence the higher the curve on FIG. 2. Moreover, even for a constant exposure level, an increase in the temperature will also result in a higher amplitude in the output of the video signal until saturation is reached.

The desired video signal for making a measurement of the width of the hot strip 14 is a steep edge gradient at a reasonable background level. In addition to temperature variations from part to part, the hot material temperature varies within itself along its length and width. The edge can have a less than desirable gradient, as for example, curve 38 and curve 40. These curves were taken at relatively low exposure levels. By increasing the exposure time, a sharper gradient is obtained, see for example, curve 42. It should also be noted that excessive exposure (curve 44) significantly increases the background level and that with all the curves, as the exposure is increased, the position of the edge as detected by the camera moves toward the background making the image appear larger.

A parameter of the video signal is selected by the master controller 32 to represent the signature of the hot material. This parameter may be for example, the maximum signal, the average signal over some number of elements, or the edge gradient. The parameter selected is a function of the material and the manufacturing and inspection process.

For steel applications where wide temperature variations occur, a maximum or average video level over the scanned dimension is a practical approach. A 500° F. temperature variation (1500° – 2000° F.) creates a twenty to one exposure range for the photo diode camera. Added to this range is the fact that the exposure condition must be sensed with the video levels below the saturation level (line 46 in FIG. 2) and then amplified to curve 42. This produces a forty to one exposure range requirement.

In summary, a signature parameter from the subject video signal from the camera is selected which represents and changes proportionally with the edge criteria desired. Electronic processing and camera operations bring this parameter to a predetermined voltage reference level, indicated as line 48, which has been empirically determined as the proper reference level for the particular process. From this reference level 48 an exposure step is made to place the system at an operating condition at the saturation level 46 (curve 42). This increase in the exposure time is required because control is lost when the photo diode array is exposed sufficiently to reach the saturation level. Thus, it is necessary to set the exposure level above the fixed threshold which is approximately 80% of the array saturation level.

With the wide variations in light intensity being emitted from the subject material 14, the cameras 10 and 12 must initially be operating at a long exposure time to allow the cameras to see the lowest temperature of the material. With the camera operating at a long line scan cycle time so that the lowest possible temperature can be seen, higher temperature subjects will saturate the photo diode array and the exact temperature of the radiation level will not be known. The task is then, in some manner, to change the scanning cycle time of the camera and again check the exposure level. This series of exposing and checking steps, undertaken by a saturation search and logic circuit 50 within the master controller, can be carried out by a number of different techniques. The most straight forward approach is a progressive step procedure. An alternative approach is a "successive approximation" technique. These methods will be explained by the following example.

Figure 3:
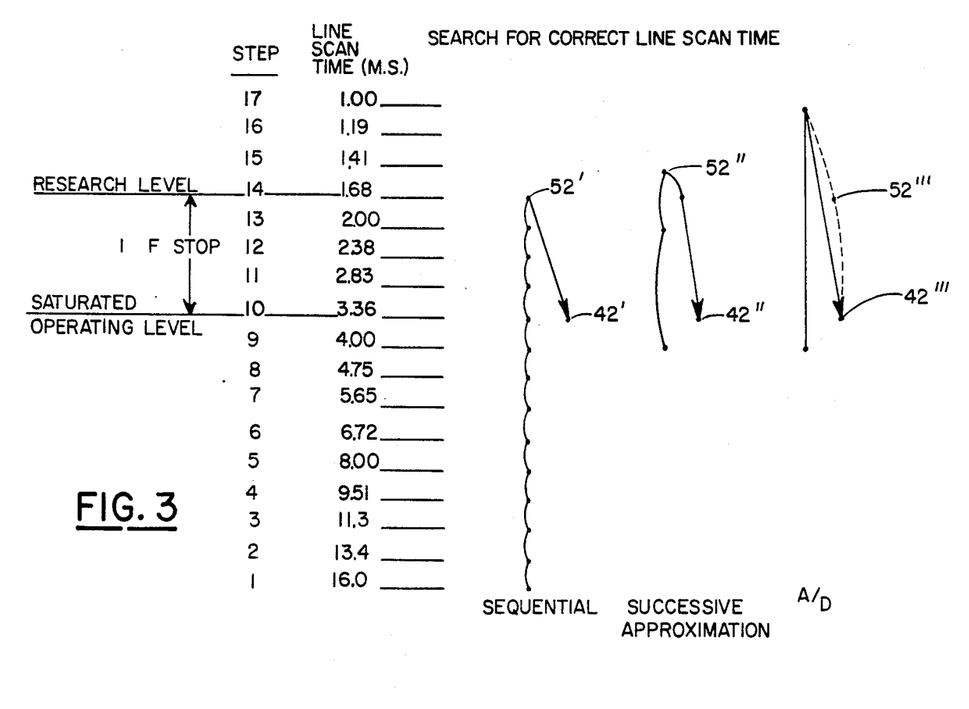
FIG. 3 is a diagramatic illustration for use in explaining the exposure range searching steps according to the invention.

For a given system it is, for example, desirable to set the exposure to an accuracy of one quarter of an F stop (19% changes). Then to encompass a 4F stop range, sixteen steps would be required with line scan cycle times, such as 1 – 16 milliseconds. Referring now more particularly to FIG. 3, with the sequential approach, the system would start at a line scan cycle time of 16 milliseconds and step through the system (that is shorter and shorter line scan cycle times) until the signature parameter of the video signal just drops below the reference level 48 (curve 52 in FIG. 2). The system would then make a percentage jump from the reference level to the desired operation level (curve 42 in FIG. 2).

This sequential stepping operation is illustrated in FIG. 3 as a series of jumps going to a point 52' and then moving to the operating point 42'. The time to complete one line scan cycle would have to be changed thirteen times until at the fourteenth step a jump would be made back to step ten, the desired saturation operation level as illustrated in FIG. 3.

With the successive approximation technique, the available range of exposure is cut in half and then a decision is made as to in which half the correct exposure lies; the half sampled or the other half. With this approach, it would take four steps to reach reference level 52" as illustrated in FIG. 3. Since the photo diode elements are integrating light energy for the next sampling as soon as they are read out, a clearing scan must be made between test scans so that the video being evaluated will have to be obtained from the correct line scan cycle time and not a combination of the new and the previous line scan cycle times. A National Semiconductor Model DM 2502, 3 or 4 integrated circuit or equivalent, will perform this successive approximation function.

Figure 4:
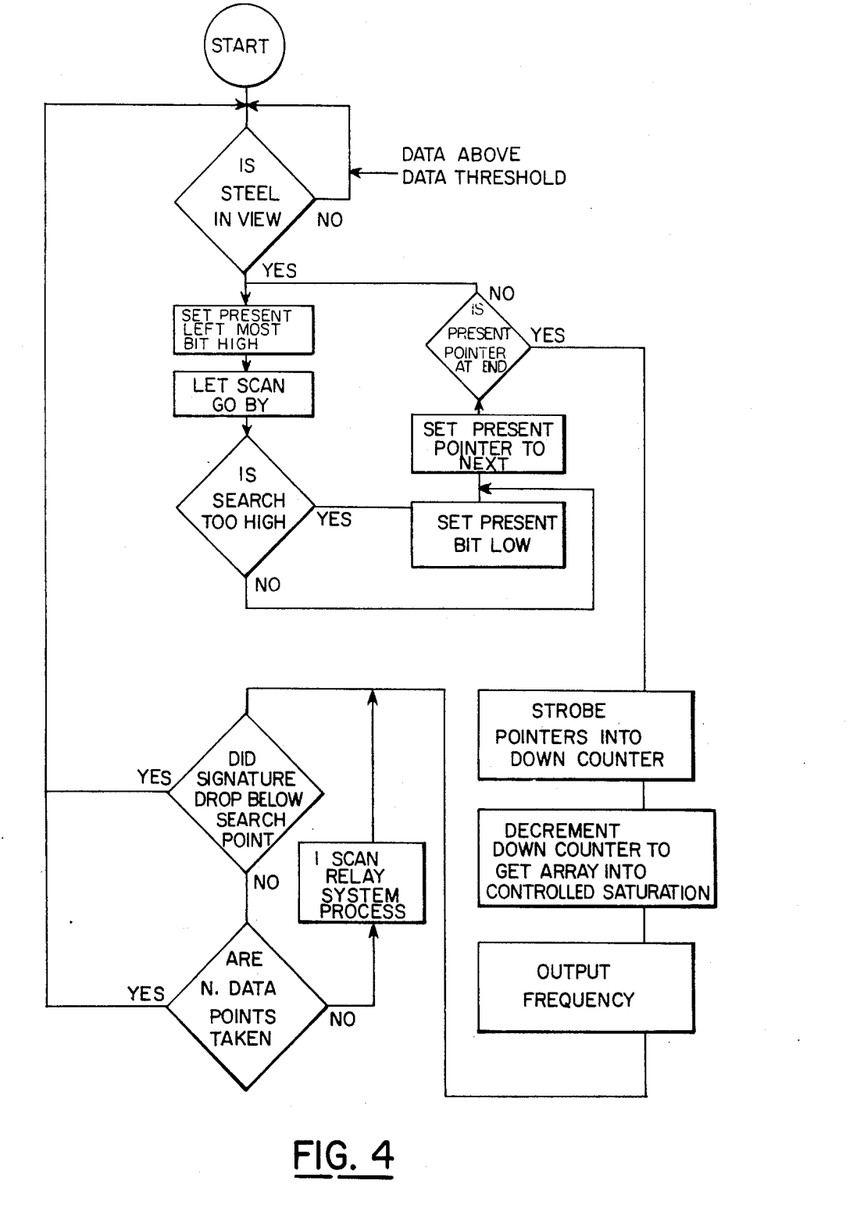
FIG. 4 is a flow chart diagram of one embodiment of the saturation search logic block depicted in FIG. 1.

Referring now more particularly to FIG. 4, a flow chart diagram illustrates how these steps are carried out in a system using such an integrated circuit for successive approximation. In the integrated circuit, the most significant bit represents the midpoint of the available F scale range, i.e., referring to FIG. 3, it represents a line scan time of 4 milliseconds. The next most significant bit will add one quarter of the range to whichever other bits are registered in the circuit. The third most significant bit adds one eighth of the available range, etc. In the flow chart shown in FIG. 4, the particular bit which is being considered at any given time is referred to as the bit to which the "pointer" is set. That bit may then be set, that is, registered, or it may be passed over.

Referring now to the flow chart shown, the system starts by first determining whether or not the hot material, such as steel, is in view. Assuming the answer is yes, the present most significant bit, that is, the leftmost bit, is set to a logic high representing half the range of the exposure available, i.e., a line scan time of 4 milliseconds on the scale shown in FIG. 3. One scanning cycle is passed by in order to allow the camera to adjust. A determination is made then as to whether or not the exposure range is in high. If the answer is no, that is, the field being sensed is still above saturation, the pointer is moved over to the next most significant bit in the successive approximation logic module. A determination is then made as to whether or not the pointer has exhausted the available bits in the approximation logic. If not, the second most significant bit, that is, the bit to which the pointer is set, is set high. This adds a quarter of the range of exposure to the half-range which is already registered. A scanning cycle is passed by and then the question is repeated as to whether or not the search is too high. Using the middle example in FIG. 3, the answer to this question is again no and the third bit is eventually set high.

After one scanning cycle has passed the question of whether or not the search is too high is answered yes and the third most bit is reset to a logic low. The remaining successive approximation logic bits are passed by in this fashion until the pointer is at the end of the logic module. At this time, the question of whether or not the pointer is at the end of the logic module is answered yes and the conditons of the bits in the successive approximation logic module are strobed into a down counter. The down counter is next further decremented to get the array into controlled saturation, corresponding to the point 42" in the middle example. A suitable photo diode array scanning frequency is then generated to correctly expose the camera.

A further analysis determines the question of whether or not the signature of the material, that is, the parameter chosen to determine its temperature, has dropped below the search point. If the answer is no, a second question is asked as to whether or not N data points have been taken. N can be any number depending on the number of repetitions desired. Assuming that N data points have been taken, the whole cycle will repeat itself so that the exposure is automatically re-evaluated both for a drop in intensity of the hot material temperature and on a timed basis.

Figure 8:
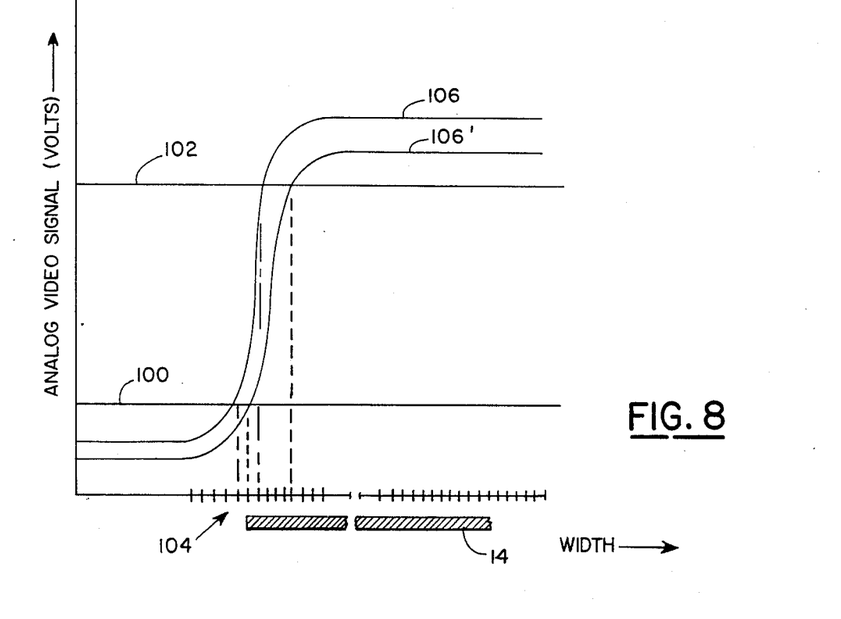
FIG. 8 is a waveform diagram, similar to FIG. 2, for use in explaining the system of a fourth embodiment of the invention.

Referring to FIG. 8, in another embodiment of the invention for correcting the exposure of the camera, two reference voltage thresholds 100 and 102 are established which are separated by at least one half of the maximum expected signal amplitude. The saturation search logic 50 detects and counts the number of photo diode elements 104 which are scanned during the time the amplitude of the video signal 106 from the camera is passing between these two levels 100 and 102. By controlling the time between "start scan" pulses, camera sensitivity to varying temperature edges is automatically maintained by the saturation search logic module 50 whereby the number of elements counted between the two thresholds will be two to three.

As the edge appears colder, the number of elements counted during the time the amplitude of the video signal 106' is passing between the two levels 100 and 102 will have a tendency to increase and hence the time between start pulses must be lengthened to adjust (increase) the exposure time. A longer time will increase the video signal gradient between the two threshold levels to thereby reduce the number of photo diode elements scanned during the time the amplitude of the video signal from the camera is passing between these two levels 100 and 102 and again maintain this number at two or three. A count of less than two indicates overexposure and the time between start scan pulses is appropriately shortened.

Figure 5:
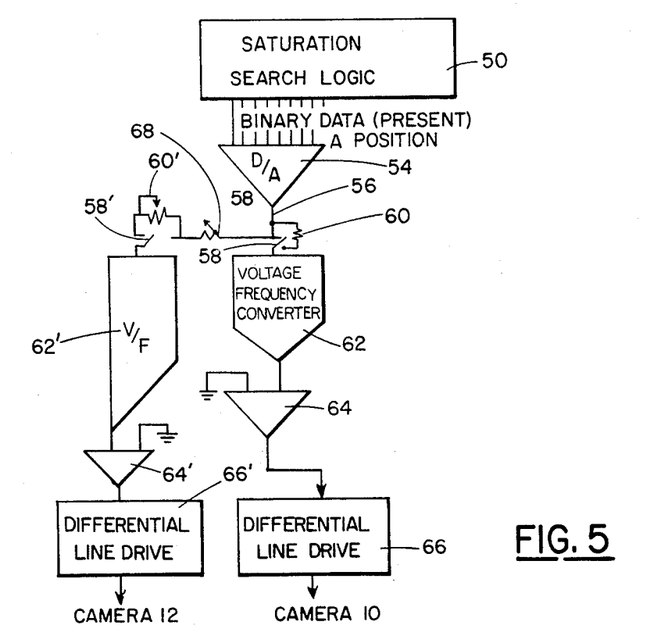
FIG. 5 is a block diagram of an automatic exposure control portion of the system according to one embodiment of the invention.

A method by which the scanning frequency is generated to control exposure will now be illustrated with respect to FIG. 5. The saturation search logic 50, which could use the successive approximation technique discussed above with reference to FIG. 4, the sequential approach discussed above with reference to FIG. 3, or the edge gradient method discussed above with reference to FIG. 8, generates a binary signal which is passed through a digital to analog (D/A) convertor 54 to thereby generate an analog output signal at point 56 which represents the desired scanning frequency to produce the correct exposure. This analog signal can be fed either directly through a switch 58 or through a variable resistor, manual saturation control 60 and then through the switch 58 to a voltage to frequency convertor 62. The output of the voltage to frequency convertor is passed through an operational amplifier 64 to the differential line driver unit 66 of the camera 10. The differential line driver 66 of the camera 10 governs the photo diode array scanning of the camera as explained above.

To control the exposure of the camera 12, the output from the digital to analog convertor 56 is fed through a variable resistor 68 and then either through a single pole double throw switch 58' or through a saturation control, variable resistor 60' to a voltage to frequency convertor 62'. The output of the voltage to frequency convertor is fed through an operational amplifier 64' to a differential line driver 66' and ultimately to the camera 12. The purpose of the reisistor 68 is to allow for adjustment of differences in the exposure characteristics between the two cameras 10 and 12.

Figure 6:
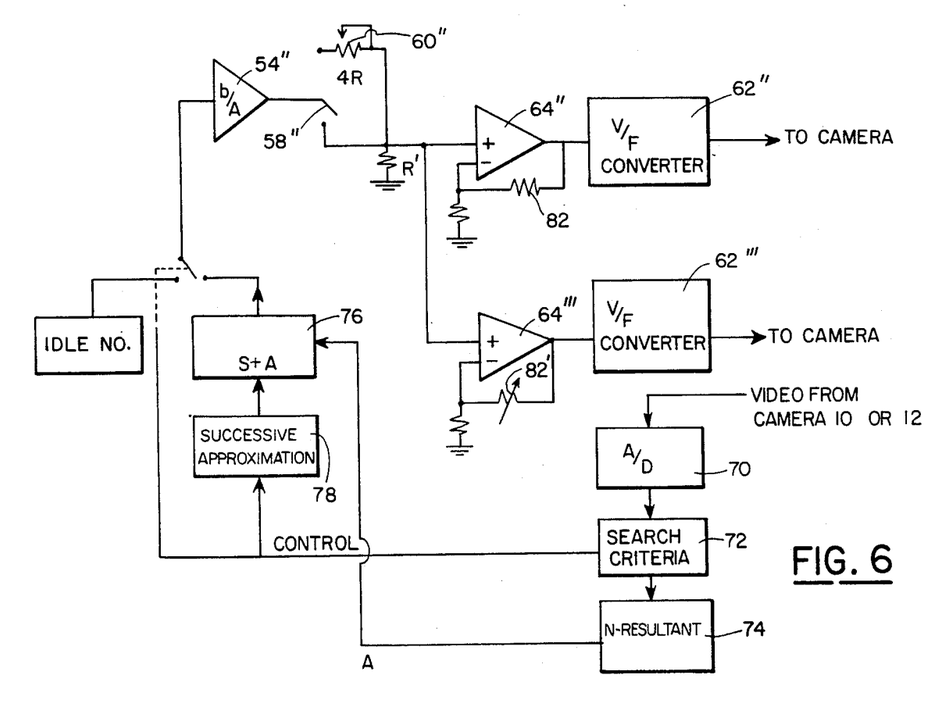
FIG. 6 is a block diagram of an exposure control system of a second embodiment according to the invention.

Referring now more particularly to FIG. 6, another approach to the timely selection and testing of the correct line scan cycle time is to employ an A/D convertor which cuts the video signal from the camera into many different levels to immediatly determine its amplitude. The video output from either the camera 10 or 12 is fed to an A/D convertor 70 where it is cut into 8 levels spanning an exposure range of 4:1, that is, two F stops. It should be borne in mind that although the camera video signal range is only about 2 F stops, the available camera exposure range by changing the scanning cycle time is about 4 F stops. With reference to FIG. 3, for example, in the right hand most portion of the figure, the first scan on the photo diode array indicates that for steps 1 – 9, the exposure of step 9 is excessive. A step function is then made, as in the successive approximation case, to step 17. The A/D convertor 70 then spans steps 10 – 17 to pick out the proper video level. The exposure changes necessary to place it at the reference level 52'''' and then to the saturated level (point 42'''') are then combined and one final step is made to the correct line scan time at step 10 (point 42''').

In terms of the schematic of FIG. 6, the output of the A/D convertor 70 is fed to a search criteria logic module 72. In the search criteria module a portion of the video signal is enhanced as related to its amplitude. For example, if the search criteria is the average amplitude of the light intensity from the workpiece over its width, then the output of the A/D convertor for each element whose output exceeds a predetermined adjustable threshold level is summed and the total is divided by the number of elements to produce an average amplitude. This average amplitude is termed the "resultant". The resultant is subtracted from the operating level N (corresponding to the point 42''' in the FIGS. 2 and 3) to produce an output A. The output A is added to an output S in a summing junction 76. The output S is derived from a three bit successive approximation module 78 which is under the control of the search criteria module 72.

The one or two bit successive approximation module 78 is made necessary because the video output (steel to background radiation) from the camera spans a range of 2 F stops whereas the available exposure range capability of the camera is 4 F stops. In reference to FIG. 3, the jump from a line scan time of 16 milliseconds to 4 milliseconds (2 F stops) represents the output of the successive approximation module's most significant bit, as explained above. The signal A represents the jump from the line scan time of 4 milliseconds to the proper line scan time to reach the point 42'''. The output from the summing junction 76 is fed to one terminal of a single pole double throw switch 80 whose pole terminal is connected through a D/A convertor 54'' to the pole terminal of a single pole double throw switch 58''. The output of the switch 58'' either goes directly or through a saturation control, variable resistor 60'' to the input of two differential amplifiers 64'' and 64'''. The outputs of these amplifiers are connected, respectively, through voltage to frequency convertors 62'' and 62''' to cameras 10 and 12, as in the embodiment depicted with reference to FIG. 5, except that the order of the amplifiers 64'' and 64''', are reversed. Each of the amplifiers 64'' and 64''' are provided with sensitivity controls 82 and 82', respectively.

When the pole terminal of the switch 80 is not connected to the output of the summing junction 76, it is connected to the output of an idle switch 84. This occurs when no material 14 is in view and the system is set to scan the product line at periodic timed intervals. The control of the switch 80 is through the search criteria module 72.

Figure 7:
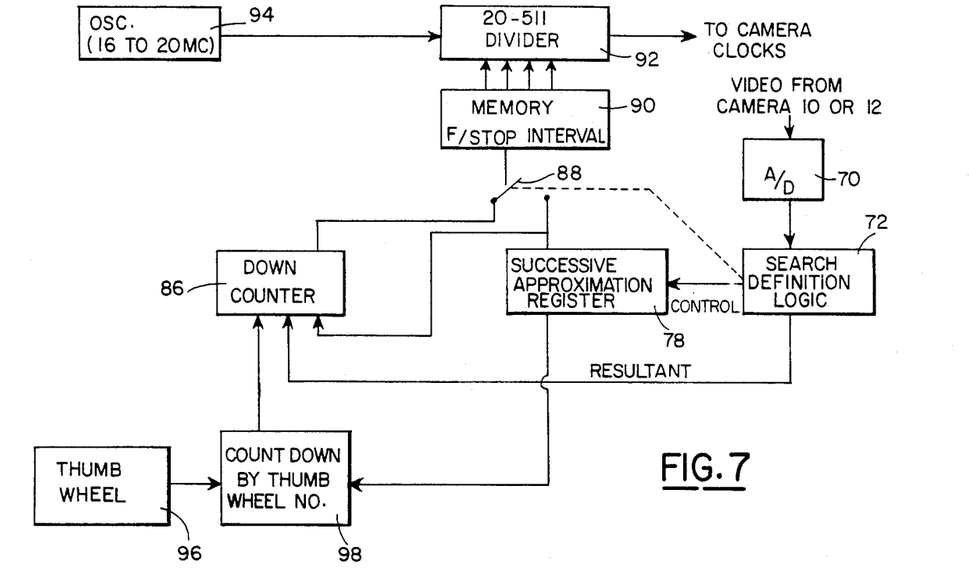
FIG. 7 is a block diagram of an exposure control system of a third embodiment of the invention.

Referring now more particularly to FIG. 7, a modification of the embodiment depicted in FIG. 6 is shown. In this embodiment, the resultant output from the search definition logic module 72 is supplied to a down counter 86. The output from the one or two bit successive approximation register 78 and the down counter 86 are supplied to different terminals of a single pole double throw switch 88. The pole terminal of the switch 88 is connected to a memory F/stop interval logic module 90 whose multiple outputs control a frequency divider module 92. The divider module 92 is supplied with clock pulses at a fixed frequency from a clock pulse generator 94. The output pulse train from the divider 92, whose frequency is some fraction of the original frequency of the generator 94 depending on the input from the F/stop interval memory 90, is supplied directly to the clocks of the cameras 10 and 12. The position of the switch arm 88 is controlled by the search definition logic module 72.

In operation, the resultant from the search definition logic is supplied to a down counter 86. The switch 88 is connected to supply the output from the successive approximation register to the memory F/stop interval module 90. Assuming the same example as described with reference to FIG. 6, the input to the memory F/stop interval will be a signal which corresponds to a line scan time of 4 milliseconds, i.e., half the exposure range. The module 90 controls the divider 92 in such a manner as to divide the frequency from the oscillator 94 down to an appropriate line scan frequency to produce this exposure value. After one line scan time has passed the search definition logic then causes the contact arm of the switch 88 to be connected to the output of the down counter 86. The down counter 86 also has been supplied with the output from the successive approximation register 78. The total output from the down counter 86 represents the correct exposure frequency derived from the output of the successive approximation register, the resultant, and the offset point to arrive at the point 42'''as shown in FIG. 3. The offset point is produced by a count down module 98 and the offset number is manually entered into the module 98 by means of a thumb wheel switch 96.

It should be apparent that the various system components described with reference to FIGS. 5, 6 and 7 can be combined by those skilled in the art after having read the foregoing description to drive more than one or two cameras either by the analog frequency generating method or by the digital, frequency dividing method of FIG. 7.

In all of these circuits of FIGS. 5 – 7, the line scan cycle time is adjusted by changing the clock frequency (sample rate). It would also be apparent that the number of clock pulses counted before a new start pulse is issued can similarly be varied, as in the embodiment discussed with reference to FIG. 8, to control the complete line scan cycle time. One advantage of this latter system is that if the exposure judgment determined by the search criteria is made right after the last active element is sampled, the counting process can be immediately shortened or lengthened as desired, thereby creating the correct integration time for the proper exposure on the next scan. No clearing scan is required to reset the exposure as is the case when the line scan frequency time is varied.

Because the edges of a workpiece at the point of any given scan may be irregular in shape, covered by scale, or emit more or less light than the bulk of the material for whatever reason it is desirable to average the results of a predetermined number of scans. The number of scans which are averaged is dependent on the particular process being monitored and could be fifteen scans, for example, in the above mentioned applications. Averaging readings also helps minimize inaccuracies caused by relative movement between the cameras and the workpiece due to vibration.

While in the above description certain circuit elements have been shown in block form, their detailed construction will be readily apparent to those skilled in the art and hence will not be described. Many of these components are readily purchaseable, such as a camera controller made by Reticon Corporation, models RS 600 series, or RS 800 series, for example.

Although the exposure control system of the invention has been particularly described with respect to linear scanned photo detector arrays it should also be apparent that the system of the invention is equally suitable for use with electronically scanned photo detector array sensors of other configurations, such as a two dimensional array, for example.

As mentioned at Page 10, cameras utilizing other than linear scanned photo diodes are suitable for use with the exposure control system of the invention. Such other suitable photo detectors would generally be of the type having electronically scanned photo site sensors whose output is proportional to the product of the exposure time and light intensity, such as charge coupled photo detector devices, for example.

In such other embodiments, as well as the above described embodiments, the parameters of the workpiece being monitored are not limited to simply the width of a sheet, but can include other dimensions such as the length or thickness of a hot slab or the diameter of a hot billet or ingot, for example. Moreover, the monitoring system of the invention is not necessarily limited to accurately measuring any dimension but applies as well to other systems which photoelectronically monitor light emitting workpieces of all types.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. Apparatus for monitoring a light emitting workpiece by sensing the intensity of lumination given off by the workpiece, the apparatus comprising electronically scanned photo detection means for sensing the level of lumination emitted over a predetermined area of the workpiece and for producing a video output signal representative thereof, the photo detection means having a predetermined dynamic exposure range which is electronically variable as a function of the time duration to complete one scanning cycle, means responsive to a predetermined parameter of the video signal for determining if the intensity of the lumination of the workpiece extends outside of the range of the photo detection means and for producing an exposure control signal, and scan control responsive to the exposure control signal for varying the time required to complete one scanning cycle of the photo detection means to shift the dynamic exposure range of the photo detection means to include the level of intensity of the lumination from the workpiece.

2. Monitoring apparatus as recited in Claim 1 wherein the photo detection means comprise an electronically scanned, light sensitive photo detector array, including means for producing a train of analog electrical pulses each having an amplitude proportional to the light intensity on a separate photo detector of the array, means for comparing each pulse to a preset threshold level to produce a train of binary, video pulses having a logical zero for analog pulses whose amplitude is below the threshold level and a logical one for analog pulses whose amplitude is above the threshold level, and wherein the means for producing the exposure control signal compare the amplitudes of a predetermined set of the analog electrical pulses with the threshold level and produce an exposure control signal which causes the scan control means to increase the time required to complete a scanning cycle when the amplitudes of the set of analog signals are below the threshold level and to decrease the time required to complete a scanning cycle when the amplitudes of the set of analog signals are above the threshold level.

3. Monitoring apparatus as recited in Claim 2 wherein the scan control means initially causes the photo detector means to be scanned at the longest available complete cycle and the exposure control signal means produces an exposure control signal to the scan control means which repeatedly and sequentially both decreases the time required for a complete scanning cycle by a predetermined increment and then compares the amplitudes of the predetermined set of analog electrical pulses with the threshold level until the amplitudes are within a predetermined amount of the threshold level, the exposure control means thereafter generating an exposure control signal to the scan control means to increase the complete scanning cycle time by a fixed amount to establish an operating exposure level for the photo detection means.

4. Monitoring apparatus as recited in claim 3 wherein the incremental decreases in the complete scanning cycle time are selected to be the equivalent of one half of the remaining available exposure range of the photo detection means until the set of analog pulse amplitudes exceed the threshold level, the exposure control signal means therafter increasing the complete scanning cycle time until the set of analog pulse amplitudes is less than the threshold level, and wherein the exposure control signal means repeat this sequence of successive approximation steps until the set of analog pulse amplitudes is within a predetermined amount of the threshold level.

5. Monitoring apparatus as recited in claim 2 wherein the scan control means initially causes the photo detector means to be scanned at the longest available complete cycle and the exposure control signal means includes analog to digital convertor means for determining whether the set of analog pulse amplitudes exceed or are less than the threshold level.

6. Monitoring apparatus as recited in claim 2 wherein the scan control means varys the scanning (sample) rate of the photo detector array to vary the time required to complete a scanning cycle and thus to vary the exposure.

7. Monitoring apparatus as recited in claim 6 wherein the scan control means includes means for producing an analog scanning signal whose amplitude represents the scanning rate and voltage to frequency convertor means for converting the analog scanning signal to a pulse train scanning signal to the photo detection means whose pulse repetition frequency corresponds to the analog scanning signal amplitude.

8. Monitoring apparatus as recited in claim 6 wherein the scan control means includes clock pulse generating means for producing a train of clock pulses at a predetermined pulse repetition rate, frequency divider means for dividing the clock pulse train and for producing a train of scanning pulses to the photo detection means at a repetition frequency which is less than the clock pulse repetition frequency in response to the exposure control signal.

9. Monitoring apparatus as recited in claim 2 wherein the scan control means varys the time period between the end of one photo detector array scan and the beginning of the next scan to vary the time required to complete a scanning cycle and thus to vary the exposure.

10. Monitoring apparatus as recited in claim 1 wherein the photo detection means comprise an electronically scanned, light sensitive photo detector array, including means for producing a train of analog electrical pulses each having an amplitude proportional to the light intensity on a separate photo detector of the array, means for comparing each pulse amplitude to a first preset threshold level and to a second, higher preset threshold level and for counting the number of pulses in the train which occur between the time of the first pulse amplitude to exceed the first threshold level and the time of the first succeeding pulse amplitude which exceeds the second threshold level, and means for producing an exposure control signal which causes the scan control means to increase the time required to complete a scanning cycle when the number of pulses counted between the first and second threshold level crossings exceeds a predetermined number and, conversely, to decrease the time required to complete a scanning cycle when the number of pulses counted between the first and second threshold level crossings is less than the predetermined number.

11. Monitoring apparatus as recited in claim 1 further comprising calibration means including means for generating a calibration lumination at a predetermined intensity, the calibration lumination generating means being located in line with the photo detection means and with the workpiece normally interposed between the calibration lumination generating means and the photo detection means such that in the absence of the workpiece the photo detection means samples the calibration lumination, thereby allowing the operation of the exposure control signal generating means to be checked against the known intensity of the calibration lumination.

12. Monitoring apparatus as recited in claim 11 wherein the photo detection means includes means for determining at least one dimension of the workpiece and the calibration means generates calibration lumination at at least two locations spaced apart by a predetermined distance to thereby allow calibration of the dimension measuring means.

13. Monitoring apparatus as recited in claim 1 wherein the photo detection means comprise an electronically scanned, light sensitive photo detector array, including means for producing a train of analog electrical pulses each having an amplitude proportional to the light intensity on a separate photo detector of the array, means for comparing each pulse to a preset threshold level to produce a train of binary, video pulses representing a logical zero for analog pulses whose amplitude is below the threshold level and a logical one for analog pulses whose amplitude is above the threshold level, means for imaging a portion of the workpiece along at least one dimension onto the photo detector array, means for producing a signal representative of the one dimension by counting the number of logical one, video pulses and wherein the means for producing the exposure control signal compare the amplitudes of a predetermined set of the analog electrical pulses with the threshold level and produce an exposure control signal which causes the scan control means to increase the time required to complete a scanning cycle when the amplitudes of the set of analog signals are below the threshold level and to decrease the time required to complete a scanning cycle when the amplitudes of the set of analog signals are above the threshold level.

14. Apparatus for monitoring an incandescent workpiece whose apparent temperature varies over its exterior surface by sensing the intensity of lumination given off by the workpiece, the workpiece being in motion relative to the monitoring apparatus, the apparatus comprising photo detection means for sensing the level of lumination emitted over a predetermined area of the workpiece and for producing a video output signal representative thereof, the photo detection means including an array of photo detectors, means for imaging a portion of the workpiece taken non-parallel to the relative direction of travel of the workpiece onto the photo detector array, means for electronically scanning the complete photo detector array a predetermined number of times and for averaging the video output signals from the separate scannings, and wherein the photo detection means has a predetermined dynamic exposure range which is electronically variable as a function of the time duration to complete one scanning cycle and further including means responsive to a predetermined parameter of the video signal for determining if the intensity of the lumination of the workpiece extends outside of the range of the photo detection means and for producing an exposure control signal, and scan control responsive to the exposure control signal for varying the time required to complete one scanning cycle of the photo detection means to shift the dynamic exposure range of the photo detection means to include the level of intensity of the lumination from the workpiece.

* * * * *